Oct. 24, 1950  R. W. TUTHILL ET AL  2,527,235
FLUID COOLED WELDING APPARATUS
Filed June 24, 1949
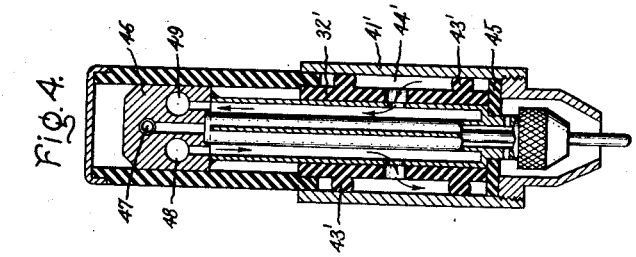
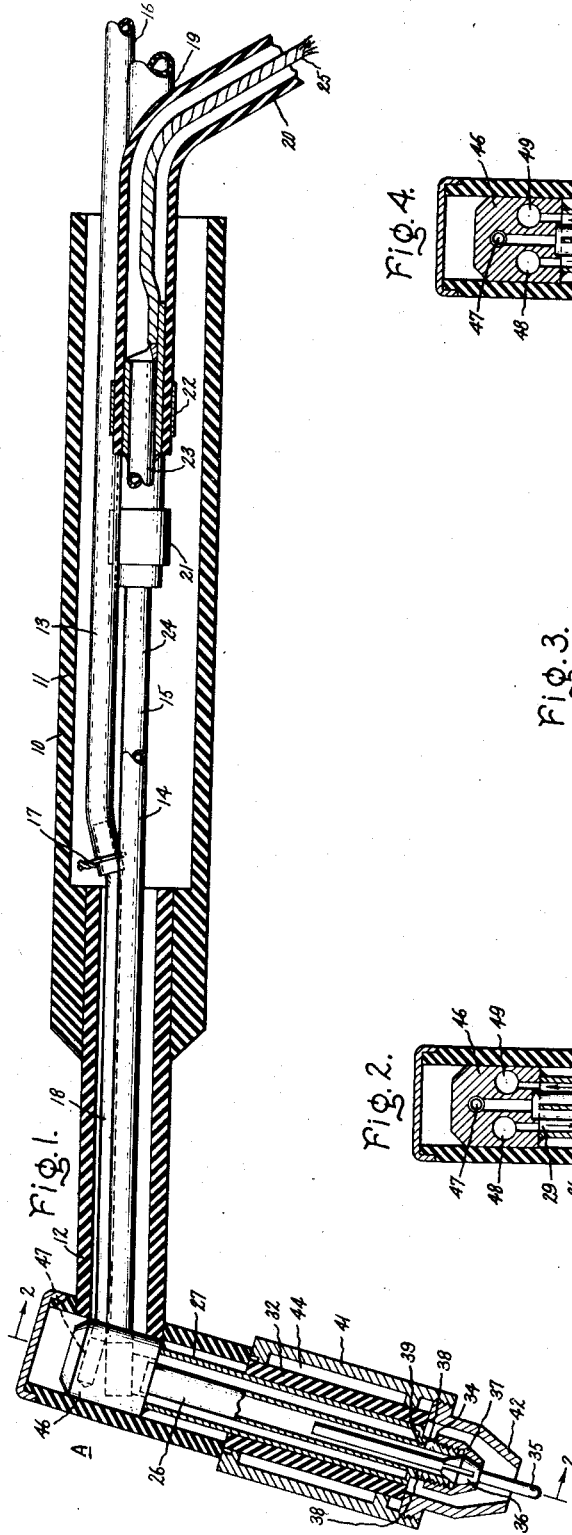
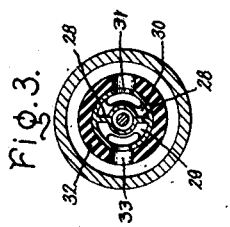
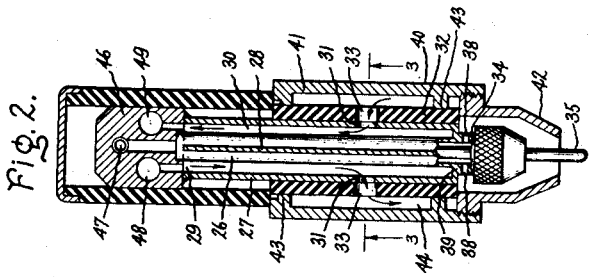
Inventors:
Roger W. Tuthill,
Alanson U. Welch, Jr.,
by
Their Attorney.

Patented Oct. 24, 1950

2,527,235

UNITED STATES PATENT OFFICE 2,527,235

FLUID COOLED WELDING APPARATUS

Roger W. Tuthill and Alanson U. Welch, Jr., Holyoke, Mass., assignors to General Electric Company, a corporation of New York Application June 24, 1949, Serial No. 100,984

10 Claims. (Cl. 219—14)

Our invention relates to apparatus for supplying gas to or about a zone of intense heat such as encountered in gas cutting and welding and more particularly to a welding tool employing an internal fluid cooling system.

An internal fluid cooling system is particularly desirable in manually operated welding apparatus employing a gas blanketed or shielded electric arc as the heating agent. In the gas shielded arc welding process, commonly referred to as inert arc welding, an electric arc of extremely high current density is formed between a virtually nonconsumable electrode, commonly tungsten, and the work. The arcing terminal of the electrode and the resultant pool of fused metal formed in the work by the arc are surrounded by a shield or blanket of inert monatomic gas, usually argon. The weld metal is thus protected from oxidation and other atmospheric contamination. Due to this gas protection, the finished welded surface is smooth, clean and uniform without spatter. Because of the extremely high welding temperatures at the head of the welding tool there is considerable danger of burning the operator's hand in which the tool is held and the possibility of melting the head itself unless suitable cooling means are provided.

It is also highly desirable in such manually operable welding apparatus that the cooling system employed be entirely enclosed within the welding tool itself in order to permit the operator a greater freedom of movement without the impediment of externally projecting fluid conduits.

Many difficult problem are encountered in providing an internally cooled welding tool, commonly referred to as an electrode holder, which is adapted for use in gas shielded electric arc welding. The electrode holder iself should preferably be lightweight, elongated and streamlined in order to facilitate the manipulation thereof. In addition, the body of the electrode holder should be constructed of relatively thick insulating material to protect the operator from burns and electric shocks. Consequently, only a very limited space is available within the electrode holder for internal conduits properly constructed to carry an adequate supply of electricity, gas and cooling fluid to the welding head. Difficulties therefore arise in the construction of an electrode holder having an internal fluid cooling system which is not unduly cumbersome or unwieldly.

Furthermore, if the welding head is provided with a metallic gas-discharge directing nozzle, the nozzle should be electrically insulated from the welding current in order to prevent undesirable arcing from the nozzle to the work. The means employed to fluid cool this nozzle should therefore also be insulated from the welding current. If internal cooling means are employed, the fluid conduits are necessarily in close proximity to the current carrying conduits and usually are electrically conductive themselves, with the result that difficulties arise in fluid cooling the nozzle without also bringing the nozzle into direct conductive relation with the electric welding current.

An object of our invention therefore is to provide an electrode holder for use in gas blanketed electric arc welding having an improved internal fluid cooling system.

Another object of our invention is to provide an electrode holder for use in gas blanketed electric arc welding having an improved fluid cooled welding head.

Another object of our invention is to provide an internally cooled electrode holder for use in gas blanketed electric arc welding which is simple and economical to construct.

A further object of our invention is to provide a fluid cooled electrode holder for use in gas blanketed electric arc welding which has a streamlined, easily manipulatable elongated configuration.

A still further object of our invention is to provide a welding head for an electrode holder adapted for use in gas blanketed electric arc welding wherein a gas discharge directing nozzle may be fluid cooled internally without being brought into direct electrically conductive contact with the welding current.

A further specific object of our invention is to provide an improved internal fluid cooling system for a welding head adapted for use in many different types of gas discharge welding apparatus.

One of the principal features of our invention is the internal fluid cooling system which we employ. This cooling system comprises a pair of internal fluid conduits whose projecting end portions are encircled by a resilient gasket which adheres tightly thereto. The outer surface of this gasket cooperates with the inner surface of a surrounding body portion of a gas directing nozzle to define a fluid-tight passageway therewith. Apertures are formed in the gasket which communicate between the interior of each fluid conduit and this passageway to permit the circulation of fluid from one of the conduits through this passageway into the other conduit and thereby to cool the body portion of the nozzle.

The novel features which we believe to be characteristic of our invention are set forth with particularity in the appended claims. The invention itself, however, together with further objects and advantages thereof can best be understood by reference to the following description taken in connection with the accompanying drawing in which Fig. 1 is a side sectional view of an electrode holder embodying our invention. Fig. 2 is a sectional view of the welding head of the electrode holder of Fig. 1 taken along line 2—2 of Fig. 1, Fig. 3 is a cross sectional view of the welding head of Fig. 1 taken along line 3—3 in Fig. 2 and Fig. 4 is a sectional view of a modification of the cooling system included in our invention.

Referring to Fig. 1, we have shown an electrode holder embodying one form of our invention comprising an insulating hollow handle 10 having a wider body portion 11 which tapers into a narrow neck portion 12. Co-extending within the handle 10 is a gas conduit 13 and a pair of fluid conduits 14 and 15. Each of these conduits are preferably divided into a rearwardly extending flexible insulating hose portion and an electrically conductive tubular portion. An insulating hose 16 is sealed within handle portion 11 by any suitable means such as a clamping wire 17, to a tube 18 extending within the handle neck portion 12 and composed of suitable electrically conductive material, such as copper. Hose 16 and tube 18 comprise the gas conduit 13. Similarly, a pair of insulating hoses 19 and 20 are respectively clamped within the handle body portion 11 by clamping rings 21 and 22 to a pair of electrically conducting tubes 23 and 24 and these hoses and tubes comprise the fluid conduits 14 and 15. The conductive tubes 18, 23, and 24 as well as the encircling insulating handle neck portion 12 are preferably constructed of slightly flexible materials to permit the entire neck to be flexed at various angles thereby providing easier manipulation of the head assembly into tight joints. Tubes 18, 23 and 24, may, for example, be flexible copper tubing while handle neck portion 12 may be composed of a rubber-like material to provide this flexibility.

An electric current carrying cable 25 extends within at least one of the hoses, such as hose 20, and is connected by any suitable fastening means such as brazing to the conductive tube 23, which is clamped within hose 20. In order to provide a greater electric current carrying capacity the tubes 18, 23 and 24 are preferably all in mutual electrically conductive contact within the neck 12 of insulating handle 10, and together they function to carry the electric current to a welding head assembly A. This welding head A is preferably mounted to the handle at an obtuse angle, as illustrated by Fig. 1, in order to provide an electric arc which is deflected from the welding head in a direction away from the operator as well as to facilitate the manipulation of the welding head into corners and other relatively inaccessible areas.

The construction of the welding head A, itself is illustrated in Figs. 2 and 3 as well as in Fig. 1. An inner axially extending electrically conductive tubular member 26, functioning as a gas conduit, is concentrically surrounded by a larger outer electrically conductive tubular member 27. The tubular members 26 and 27 are supported in concentric spaced apart relation by a pair of axially extending septums 28, best seen in Figs. 2 and 3. The septums 28 are sealed between the outer surface of the tubular member 26 and the inner surface of the tubular member 27, and define a pair of arcuate elongated fluid conduits 29 and 30 therewith. Each of the fluid conduits 29 and 30 has an outlet 31 best seen in Figs. 2 and 3, formed in the tubular member 27 adjacent its end portion, but there is no direct fluid connection between the fluid conduits 29 and 30 themselves. Although, for reasons hereinafter to be explained, we preferably utilize the concentric tubular members 26 and 27 to define fluid conduits 29 and 30, it is to be understood that the fluid conduits 29 and 30 may have a different cross-sectional configuration and may have a different location within the welding head. Such modifications will readily occur to those skilled in the art.

Tightly encircling the end portion of tubular member 27 is a resilient insulating gasket 32 which has an inner diameter slightly smaller than the outer diameter of tubular member 27 and thereby tightly adheres thereto in order to make a fluid tight seal therewith. A pair of apertures 33 which register with the oulets 31 are formed in the body of the gasket 32. Because of its resiliency the gasket 32 not only functions as an insulating member, but also as a gas and fluid seal as will be more fully explained below. Furthermore, because of the extremely high temperatures to which the gasket 32 is subjected during welding, the gasket 32 is preferably composed of a rubber-like insulation material which possesses the property of withstanding high temperatures without melting or decomposition. Examples of such suitable resilient high temperature resistant materials are polytetrafluoroethylene, polymonochlorotrifluoroethylene, and silicone rubber.

Referring again to Fig. 1, the tubular member 26, which functions as a gas conduit, terminates in a cylindrical member 34 which has a threaded open end portion adapted to receive an axially extending welding electrode 35. This welding electrode 35 may be axially inserted through the cylindrical member 34 into the gas conduit 26. Electrically conductive electrode retaining means including a partially split collet 36 and a collet gripping member 37 are also provided. The collet 36 is slidably mounted on the welding electrode 35 and functions in a known manner to clamp around the welding electrode and to sealably enclose the open end of cylindrical member 34 when the collet gripping member 37 is threaded to the end of cylindrical member 34 as illustrated in Fig. 1 and Fig. 2. A plurality of gas outlets 38 are formed in a collar 39 of cylindrical member 34 to deliver gas around the retained welding electrode 35.

Concentrically surrounding the cylindrical gasket 32 is a nozzle 40, composed of metallic or ceramic material, which has a cylindrical body portion 41 and a tapered open end portion 42, preferably detachable, which projects beyond the end of gasket 32. The nozzle end portion 42 is preferably threaded into the end of the nozzle body portion 41 as illustrated and serves to direct the gas discharge from outlets 38 around the welding electrode 35. It will be appreciated that by constructing a nozzle having a detachable end portion, we permit the utilization of a plurality of nozzle end portions having different size orifices with the same body portion, thereby enabling the same welding head to be used with electrodes of various diameters.

The diameter of the inner peripheral surface of the nozzle body portion 41 is slightly larger than the outer diameter of the gasket 32 which it surrounds. The inner surface of the nozzle body portion 41 is constructed to define together with the outer surface of the gasket 32 at least one annular fluid tight passageway therewith.

One convenient construction is illustrated in Figs. 1 and 2 and comprises a pair of longitudinally spaced annular ridges 43 projecting from the inner surface of nozzle body portion 41 and constructed to clamp tightly against the outer surface of gasket 32 to define an annular fluid tight passageway 44 therebetween. Although the projecting ridges 43 are preferably constructed as an integral part of the nozzle body portion 41, it will be appreciated that separate longitudinally spaced sealing members may alternatively be provided, in order to enclose a fluid-tight passageway between the gasket 32 and the nozzle body portion 41. Due to this annular passageway 44, fluid may circulate as indicated by the arrows in Fig. 2 through a series path from one of the fluid conduits, such as conduit 29, through the passageway 44 and back into the other fluid conduit 30 thereby to cool the body portion 41 of the nozzle 40.

Referring to Fig. 4, we have shown a modification of our invention including a heat shielding means to enable the utilization of an ordinary non-heat resistant gasket, such as gasket 32', and illustrating an alternative means of sealably enclosing an annular passageway adjacent the body portion of the nozzle. The resilient insulating gasket 32' is provided with a pair of spaced annular ridges 43' projecting from the outer surface thereof and clamping tightly against the inner surface of a cylindrical nozzle body portion 41'. The inner surface of nozzle body portion 41', the outer surface of gasket 32' and the gasket ridges 43' define an annular passageway 44' which functions in the same manner as the passageway 44 in Figs. 1, 2 and 3 to enable the fluid circulation adjacent to nozzle body portion 41'. An insulating washer 45 composed of suitable heat resistant material, such as previously mentioned, is interposed between the nozzle end portion 42 and the gasket 32'. It will be appreciated that this washer 45 functions to shield the heat adjacent end portion of the gasket 32' from immediate contact with the excessive temperatures produced at the welding tip during welding. Since the remainder of the gasket 32' is cooled by the flow of fluid through passageway 44', the gasket 32' may therefore be composed of non-heat resistant resilient insulating material such as ordinary rubber. It will be appreciated that similar heat shielding means may be employed in the welding head of Fig. 1, to enable gasket 32 to be composed of ordinary resilient insulating material.

The proper connections between the fluid and gas conduits in the handle 10 and the fluid and gas conduits in the welding head A may be accomplished by an electrically conductive coupling member 46. The coupling member 46 has one side secured in a fluid tight manner by such means as brazing to the conduits 18, 23 and 24 which extend within the handle 10. These latter conduits are respectively connected by three separate angular bent channels formed within the coupling member 46 to the corresponding conduits 26, 29 and 30 which extend within the welding head A. The handle gas conduit 18 communicates with the head gas conduit 26 through a central bent coupling channel 47; and the handle fluid conduits 23 and 24 communicate respectively with the head fluid conduits 29 and 30 through bent coupling channels 48 and 49 extending on either side of the gas coupling channel 46. Because of the consequent ease of assembly, we have illustrated the head and handle gas and fluid conduits as being separate members connected by the coupling member 46. It will be appreciated however that the head conduits may alternatively be constructed as the projecting end portions of the handle conduits rather than as separate members coupled thereto.

In the operation of the electrode holder illustrated in Fig. 1 an inert shielding gas such as argon is fed through gas conduits 13 and 26 and delivered through gas outlets 38 into the gas directing nozzle end portion 42. A cooling fluid, such as water, enters the fluid conduit 14 under moderate pressure and circulates in sequence through a series path comprising head fluid conduit 29, annular passageway 44, and back through head fluid conduit 30 and handle fluid conduit 15 from which the fluid is emitted. The electric current is applied through cable 25 and is carried to the welding electrode by electrically conductive conduits 18, 23, 24, electrically conductive coupling member 46, electrically conductive head tubular members 26 and 27 and the electrically conductive electrode retaining means comprising members 34, 36 and 37. It will be appreciated that the fluid employed is preferably electrically non-conductive. If water is used, the water should be relatively free of electrically conductive impurities.

An important advantage of our improved construction is that it provides a compact, easily manipulatable electrode holder for use in gas blanketed electric arc welding which is simple in construction and contains a completely internal improved fluid cooling system. By surrounding an axially extending gas conduit in the welding head, such as conduit 26, by a pair of coextending fluid conduits, such as conduits 29 and 30, we enable the circulation of fluid immediately proximate the members which are in direct heat conductive relation with the welding electrode and thereby cause the rapid dissipation of the heat generated during welding. In addition, the entire internal gas and coolant conduit assembly of the welding head has a small cross-sectional area and occupies very little space within the welding head. Furthermore, by utilizing an apertured resilient insulating gasket, such as gasket 32, interposed between internal current carrying conduits and a concentrically located nozzle, we provide means both for insulating the nozzle from the welding current and for fluid cooling of the major portion of the nozzle itself. It will also be appreciated that, due to its resilient composition, this interposed gasket also functions both as a gas seal to prevent gas leaks through the back of the nozzle body portion and as a fluid seal to prevent any fluid leaks in the end portions of the internal conduits which it tightly encircles.

It is apparent that the fluid cooled welding head which we have herein illustrated and described may be easily adapted for use in machine operated as well as manually operated welding apparatus; and that the internal fluid cooling system may be easily adapted to many different types of gas cutting and welding apparatus. Many other modifications of our invention will obviously occur to those skilled in the art and we intend therefore, by the appended claims to cover all such modifications as fall within the spirit and scope of our invention.

What we claim as new and desire to secure by Letters Patent of the United States is:

1. A fluid cooled electrode holder adapted for use in gas blanketed electric arc welding, comprising a hollow insulating handle, a gas conduit and a pair of fluid conduits within said handle, at least one of said conduits containing electric current carrying means, each of said conduits having thermally and electrically conductive end portions in electrically conductive relation with said current carrying means and substantially coextending beyond an end of said handle, said gas conduit end portion having at least one gas outlet, electrically conductive welding electrode retaining means axially secured to the gas outlet end of said gas conduit, a resilient electrically insulating gasket encircling and in frictional engagement with said coextending conduit end portions, a gas discharge directing nozzle enclosing said gas outlet in said gas conduit and having a body portion surrounding and spaced from said gasket, and at least two longitudinally spaced sealing members hermetically sealed between the inner surface of said nozzle body portion and the outer surface of said gasket to define at least one fluid tight passageway therebetween, said gasket having at least one aperture communicating between the interior of each of said fluid conduit end portions and said passageway to enable the circulation of fluid therethrough.

2. A fluid cooled electrode holder adapted for use in gas blanketed electric arc welding comprising, a hollow insulating handle, a gas conduit and a pair of fluid conduits within said handle, at least one of said conduits containing electric current carrying means, said gas conduit terminating in an electrically conductive tube projecting beyond one end of said handle, said tube being in electrically conductive relation with said current carrying means, having at least one gas outlet formed in the end thereof and having electrically conductive electrode retaining means axially secured to the gas outlet end of said tube, said pair of fluid conduits having projecting end portions substantially coextending on opposite sides of said tube, and said fluid conduit end portions having a common outer enclosing member surrounding said tube end portion, a gasket of resilient electrically insulating material encircling and constructed to adhere tightly to said outer enclosing member, a nozzle having a gas discharging tip and a body portion surrounding and spaced from said gasket, at least two spaced sealing members hermetically sealed between the inner surface of said nozzle body portion and the outer surface of said gasket to define at least one fluid tight passageway therebetween, the body of said gasket having apertures respectively communicating with outlets in the end portions of said fluid conduits to enable the circulation of fluid from each of said fluid conduits through said passageway, and a resilient heat resisting washer encircling said gas outlet end of said tube and interposed between said gasket and the gas discharging tip portion of said nozzle to shield said gasket from the heat of an arc established at the arcing terminal of said electrode in its said retaining means.

3. In apparatus having a hollow handle and a gas conduit axially extending within said handle and projecting beyond an end thereof, an internal fluid cooling system comprising, a pair of fluid conduits supported alongside said gas conduit within said handle and having substantially coextending projecting end portions, a gasket of resilient heat resistant material encircling and tightly adhering to said projecting conduit end portions, and a gas discharge directing nozzle having a body portion surrounding said gasket, said nozzle body portion having an inner surface in spaced relation to the outer surface of said gasket, at least one of said spaced surfaces having a ridge configuration constructed to clamp tightly against the other of said surfaces to define at least one fluid tight passageway therebetween, said gasket having at least one aperture communicating between said passageway and the interior of each of said fluid conduits to enable the circulation of fluid therethrough.

4. Apparatus comprising a hollow handle, a gas conduit axially extending within said handle and projecting beyond an end thereof, a pair of fluid conduits supported alongside said gas conduit and having substantially coextending projecting end portions, a gasket of resilient material encircling and tightly adhering to the body of said projecting conduit end portions, a nozzle having a gas discharging tip portion and a body portion surrounding said gasket, said nozzle body portion having an inner surface in spaced relation to the outer surface of said gasket, at least one of said spaced surfaces having a ridged configuration constructed to clamp tightly against the other of said surfaces to define at least one fluid tight passageway therebetween and said gasket having at least one aperture communicating between said passageway and the interior of each of said fluid conduits to enable the circulation of fluid therethrough, and heat shielding means interposed between said gasket and the gas discharging tip portion of said nozzle.

5. Apparatus comprising an axially extending gas conduit terminating in at least one gas outlet, a pair of fluid conduits substantially coextending alongside said gas conduit and having closed ends adjacent said gas outlet end of said gas conduit, a gasket of resilient material mounted on and frictionally engaging said conduits, a gas discharge directing nozzle having an end portion encircling said gas outlet end of said gas conduit and having a body portion surrounding said gasket in spaced relation thereto, and a pair of spaced sealing members located between the outer surface of said gasket and the inner surface of said nozzle body portion to define fluid tight passageway therebetween, said gasket having at least one aperture communicating between said passageway and at least one fluid outlet of each of said fluid conduits to enable the circulation of fluid from said conduits through said passageway.

6. In an electrode holder adapted for use in gas blanketed electric arc welding, an inner tubular member and a spaced co-axially extending outer tubular member, said tubular members being electrically conductive, a pair of axially extending septums sealed between adjacent surfaces of said tubular members to define therewith a pair of axially extending fluid conduits, said inner tubular member constituting a gas conduit and having at least one gas outlet formed in the end thereof, a gasket composed of electrically insulating resilient heat resistant material tightly encircling and adhering to the end portion of said outer tubular member adjacent said gas outlet end, and a gas discharge directing nozzle having an open end tip portion enclosing said gas outlet in the end of said inner tubular member and having a body portion surrounding said gasket in spaced relation thereto, said nozzle body portion having at least two longitudinally spaced annular ridges projecting from the inner surface thereof and constructed to clamp tightly against the outer surface of said gasket to define at least one an annular fluid tight passageway therebetween, said gasket having at least one aperture communicating between said passageway and each of said fluid conduits to enable the circulation of fluid from one of said fluid conduits through said passageway to the other of said conduits.

7. An electrode holder for use in gas blanketed electric arc welding comprising an inner tubular member and a spaced co-axially extending outer tubular member, said tubular members being electrically conductive, a pair of septums sealed between the outer surface of the inner tubular member and the inner surface of the outer tubular member to define therewith a pair of axially extending fluid tight conduits, said inner tubular member constituting a gas conduit and having at least one gas outlet formed in the end thereof, means to retain a welding electrode axially extending from said gas outlet end of said conduits in electrically conductive relation therewith, a gasket composed of resilient electrically insulating heat resistant material tightly encircling the end portion of said outer tubular member adjacent said gas outlet end, and a gas discharge directing nozzle having a body portion surrounding said gasket in spaced relation thereto and having a detachable open end portion arranged to enclose the gas outlet end of said inner tubular member and to surround an electrode in said electrode retaining means, said gasket having at least two longitudinally spaced ridges formed in the outer surface thereof and constructed to clamp tightly against the inner surface of said nozzle body portion to define at least one fluid tight passageway therebetween, said gasket having at least one aperture communicating between said passageway and at least one fluid outlet of each of said fluid conduits to enable the circulation of fluid from said conduits through said annular passageway.

8. Apparatus subjected to heat and having an internal gas conduit having at least one gas outlet in its end portion, an internal fluid cooling system comprising a pair of fluid conduits substantially coextending alongside said gas conduit, a resilient gasket encircling and constructed to adhere tightly to said gas and fluid conduits, a resilient heat resistant washer covering the outer end of said gasket, and a gas discharge directing nozzle enclosing said gas outlet in said gas conduit and having a body portion surrounding and spaced from said gasket, and at least two longitudinally spaced sealing members hermetically sealed between the inner surface of said body portion of said nozzle and the outer surface of said gasket to define at least one fluid tight passageway therebetween, said gasket having at least one aperture communicating between said passageway and at least one fluid outlet of each of said fluid conduits to enable the circulation of fluid from one of said fluid conduits through said passageway to the other of said fluid conduits.

9. In a gas blanketed electric arc welding head having an axially extending electrically conductive gas conduit, an internal fluid cooling system comprising a pair of electrically conductive fluid conduits substantially co-extending with said gas conduit, said fluid conduits being constructed to surround completely said gas conduit, a substantially cylindrical electrical insulating gasket composed of resilient heat resistant material encircling said fluid conduits and constructed to adhere tightly thereto, and a gas discharge directing nozzle having a body portion surrounding said gasket in spaced relation thereto, said nozzle body portion having a pair of longitudinally spaced annular ridges projecting from the inner surface thereof and constructed to clamp tightly against the outer surface of said resilient gasket to define an annular fluid tight passageway therebetween, said gasket having an aperture communicating between said passageway and a fluid outlet of each of said fluid conduits to enable the circulation of fluid from said conduits through said passageway.

10. In a gas blanketed electric arc welding head having an axially extending electrically conductive gas conduit, an internal fluid cooling system comprising, an electrically conductive tubular member surrounding said gas conduit in spaced relation thereto, a pair of axially extending septums sealed between the outer surface of said gas conduit and the inner surface of said tubular member to define a pair of axially extending fluid conduits therewith, each of said fluid conduits having a closed end and having at least one fluid outlet formed in said enclosing tubular member, a gasket composed of electrically insulating heat resistant rubber-like material encircling said tubular member and constructed to adhere tightly thereto, and a gas discharge directing nozzle having a body portion surrounding said gasket in spaced relation thereto, said gasket having a pair of longitudinally spaced ridges projecting from the outer surface thereof and constructed to clamp tightly against the inner surface of said nozzle body portion to define a fluid tight passageway therebetween, said gasket having at least one aperture communicating between each of said fluid outlets and said annular passageway to enable the circulation of fluid adjacent said nozzle body portion.

ROGER W. TUTHILL.
ALANSON U. WELCH, JR.

REFERENCES CITED

The following references are of record in the file of this patent:

UNITED STATES PATENTS

| Number | Name | Date |
| --- | --- | --- |
| 2,468,804 | Breymeier | May 3, 1949 |
| 2,468,805 | Herbst | May 3, 1949 |
| 2,468,806 | Pilia | May 3, 1949 |
| 2,468,807 | Herbst | May 3, 1949 |
| 2,468,808 | Drake | May 3, 1949 |
| 2,473,258 | Potter | June 14, 194 |